Sept. 11, 1934.　　　　F. H. LAMB　　　　1,973,214
HINGED CONNECTION
Filed Jan. 3, 1933　　　　2 Sheets-Sheet 1
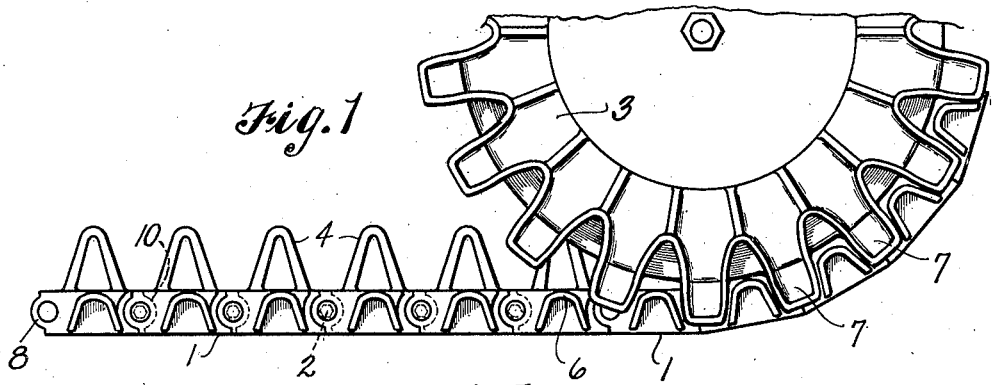
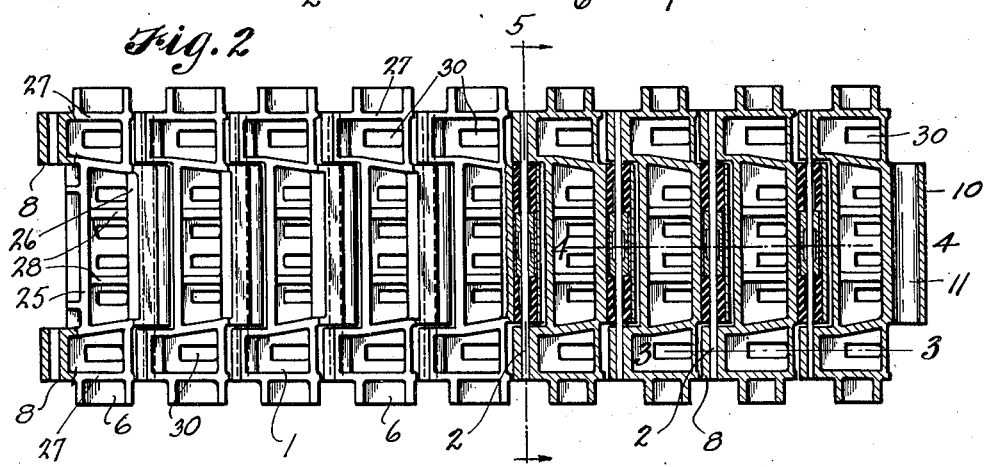
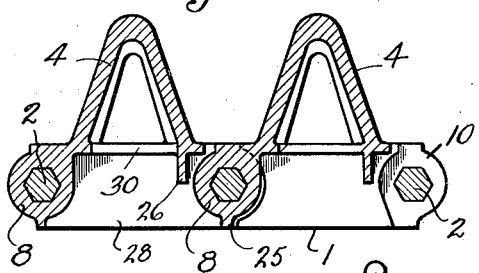
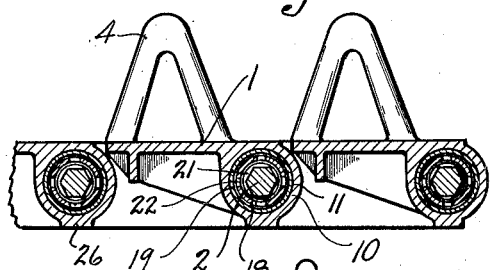
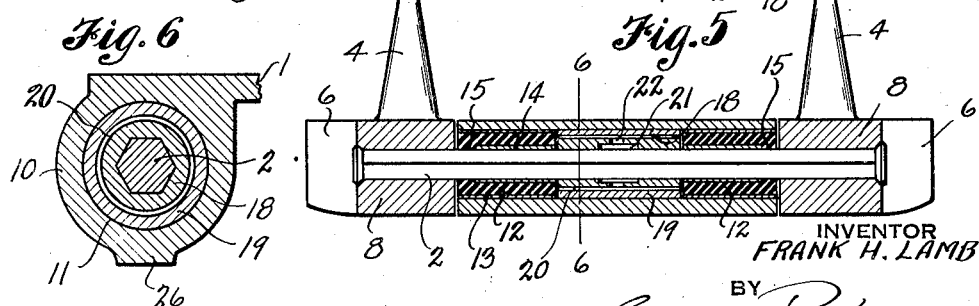
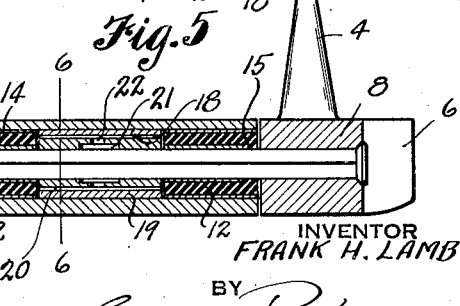
INVENTOR
FRANK H. LAMB
BY
Cook + Robinson
ATTORNEY Sept. 11, 1934.                F. H. LAMB                1,973,214
                          HINGED CONNECTION
                         Filed Jan. 3, 1933        2 Sheets-Sheet 2
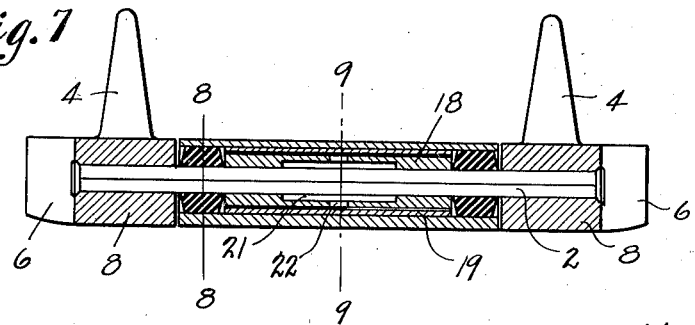
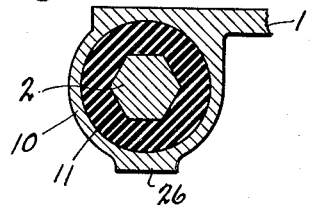 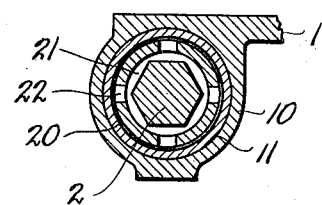
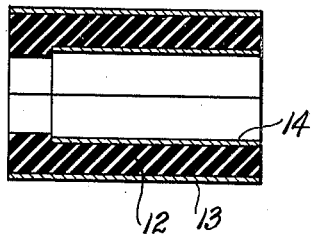 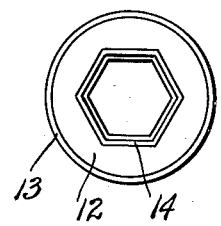
INVENTOR
FRANK H. LAMB
BY
Cook & Robinson
ATTORNEY Patented Sept. 11, 1934

1,973,214

UNITED STATES PATENT OFFICE 1,973,214

HINGED CONNECTION

Frank H. Lamb, Hoquiam, Wash.

Application January 3, 1933, Serial No. 649,796

7 Claims. (Cl. 305—10)

This invention relates to hinged connections and it has reference more particularly to rubber bushed connections of a character especially suited for joining hingedly associated parts of any mechanism through which heavy pull or strain is applied, and wherein it is essential that the bearing surfaces be protected against damage by entrance of foreign matter and desirable that they be cushioned against shock, impact and vibration incident to normal use.

The principal objects of the present invention reside in the provision of a rubber bushed, hinge connection of the above stated character that is especially desirable for joining together the shoes of a tread, or track, as applied to a tractor of the track laying type, although it is to be understood that the invention is not to be confined to this particular use.

Explanatory to the present invention, it will be mentioned here that it is now common practice to pivotally connect the traction shoes of a tractor tread by means of transverse hinge pins mounted in metallically bushed bearings. It is not unusual, since no provision has heretofore been made to prevent it, for dirt, grit, sand and moisture to work into the joints about the hinge pins and to permeate the bearing surfaces much to the detriment of these parts. There is, consequently, a rapid wearing away of these parts by reason of their being unprotected and this results in elongation of the track and a change in pitch, uneven wear and misalinement, with a consequent loss in operating efficiency, shortening of the life of the track and in increase in cost of maintenance.

In view of the above, it has been an object of this invention to provide a hinge construction, or connection, that overcomes the above undesirable results; that is fully as strong and lasting as those heretofore employed; which is so constructed as to be positively protected against entrance of any detrimental foreign matter such as dirt, grit and moisture; which is resilient and yieldable to an extent sufficient to relieve the connection of shock of impact, vibration and strain in heavy use; which has long life and low cost of upkeep; wherein there are no metal to metal surfaces normally in contact or tension and wherein overload on the resilient bushings is taken by a normally inactive roller bearing capable of withstanding the maximum strains placed on the connection.

It is also an object of this invention to incorporate the present hinge connection with a tractor tread made up of traction shoes of novel form and embodying features of construction which makes possible the quick and easy assembly or disassembly of the tread without use of special tools or equipment; which provides a track capable of high speed operation without detrimental vibration; wherein provision is made for self cleaning, and which has no detrimental effect on roadways over which it operates.

Other objects of the invention reside in the details of construction of the hinged connection and in the details of the individual shoes as will hereinafter be described.

In accomplishing these and other objects of the invention, I have provided the improved details of construction, the preferred forms of which are illustrated in the accompanying drawings, wherein—

Fig. 1 is a view, showing in side elevation, a section of a tractor track equipped with traction shoes and hinged connections embodied by the present invention.

Fig. 2 is a view showing the traction surface of a section of track; certain hinged connections being shown in section for better illustration.

Fig. 3 is an enlarged, cross sectional view, taken on line 3—3 in Fig. 2.

Fig. 4 is an enlarged cross sectional view on line 4—4 in Fig. 3.

Fig. 5 is a sectional view taken transversely of the track in a plane axially of one of the hinged connections, as on line 5—5 in Fig. 2.

Fig. 6 is a cross section on line 6—6 in Fig. 5.

Fig. 7 is a sectional detail of a hinge connection of an alternative form.

Fig. 8 is an enlarged section on line 8—8 in Fig. 7.

Fig. 9 is a cross section on line 9—9 in Fig. 7.

Fig. 10 is a sectional view of the preferred form of rubber bushing, as used in the construction of Fig. 5.

Fig. 11 is an end view of the same.

Referring more in detail to the drawings—

In Figs. 1 and 2 I have illustrated a section of the tread, or track, of a tractor. This track embodies a series of traction shoes 1 pivotally connected by hinge pins 2 to provide an endless belt track adapted to operate about supporting and driving wheels which may be of that kind designated in Fig. 1, by reference numeral 3. The several pivotally hinged shoes constituting the track are alike in size and construction and are suitably ribbed on their outer surfaces, as will presently be described, to give them necessary strength and to afford the desired traction when in contact with the ground. As here shown these shoes are provided adjacent opposite ends, on their inner faces, with projecting lugs 4 of tapered form adapted to engage during travel of the track with certain guides, not shown, in the nature of rails or wheels mounted in the track frame, thereby to guide the track and prevent possible lateral displacement from its mounting and driving wheels. Also, the shoes are provided at their ends with projecting lugs 6 to be received between sprocket teeth 7 on the wheel 3 to effect a positive driving connection between the wheel 3 and track.

Each shoe, in the construction illustrated, is provided at opposite ends of one longitudinal edge with hinge ears 8—8 in which opposite ends of a hinge pin 2, for attaching it to the adjacent shoe, is fixedly mounted. At its opposite edge each shoe is provided with an elongated central lug, or hinge ear, 10 of a length to be fitted between the ears 8—8 of the adjacent shoe. This lug 10 is cylindrically cored out providing a chamber 11 containing the connecting hinge pin 2 axially therethrough, as seen best in Fig. 5; it being observed that the hinge pin in this illustration is of hexagonal cross section and is fitted at its ends tightly within the ears 8—8 but is substantially smaller than the chamber 11 of lug 10. The unround, cross sectional shape of the pin is to afford better means of preventing its rotating in the ears 8—8, or in the bushing applied thereto, as presently described. However, it may be of other cross sectional shape.

Fitted tightly within the opposite ends of the cored out chamber 11 of ear 10 and also about the hinge pin 2 are rubber bushings 12—12 which are of such character as to sustain, without any material deformation, all ordinary or normal strains applied through the connection. These bushings, however, are absolutely tight about the pin and in the chamber ends and the hinging movement of the connected shoes is possible through deformation of the rubber bushings without slippage between them and the surface of either the chamber walls or pin.

To aid in the assembly of bushings with the pins and shoes, the bushings may be lined exteriorly with thin metal shells, or sleeves 13 as seen best in Fig. 10. Likewise, the central opening of the bushing may be lined with a thin metallic sleeve 14, but it is desirable, as a means of insuring the joint about the pin against leakage of moisture thereinto, that the inner sleeve shall terminate short of the outer end of its bushing to permit of watertight fit of the rubber against the pin, as seen at 15 in Fig. 5. In some instances it may be found more desirable to eliminate the shell and sleeve entirely. The most important requirement is that there be no slippage between the bushing and pin, or bushing and chamber wall and that the joints be moisture and dirt proof.

With bushings of proper strength by reason of design, size and composition, it is possible to absorb all normal jar, vibration and shock incident to operation, in the bushings. However, there are occasions when the hinge connections will be subjected to abnormal strain and this might cause the bushings to be deformed beyond their elastic limits to the detriment of the joint. Therefore, I have made provision to avoid this by equipping each hinge pin with an overload bearing roller 18 applied about the pin between the ends of the bushings 12—12 and concentric of the chamber 11 and within a hardened bushings sleeve 19 tightly fitted in the chamber. The roller 18 is somewhat smaller in diameter than the sleeve, leaving an annular, open space between them as seen at 20 in Fig. 6, and under ordinary operation and strain applied through the track, the roller does not come in contact with the sleeve, but should the track be placed at any time under unusual strain, deformation of the bushings permits the roller to move into bearing contact with the sleeve to relieve the bushings of any detrimental deformation.

The roller 18 is provided with an annular, internal recess 21 for containing a lubricant to be admitted to the adjacent surfaces of the roller and sleeve through radial openings 22 in the roller.

In a modified form of construction illustrated in Figs. 7, 8 and 9, rubber bushings 12a—12a that are relatively short as compared with those of the form of Fig. 5, are used and these are not metal lined but are fitted tightly to the pin and in the chamber ends. The overload roller in this modification is relatively long. In this modified construction the function of the bushings is primarily to seal the hinge joint, but they serve, to an appreciable extent, to absorb shock and vibration incident to operation.

With track shoes bushed and hinged in this manner, there is no metal to metal, frictional contact under ordinary use. Under heavy strain, the hardened overload rollers 18 have rolling contact with the hardened sleeves 19 and by reason of the very slight relative movement in the hinging operation and excellent lubrication, there is practically no friction possible. The sealing effect of the bushings positively prevents entrance of any foreign matter to the bearings and thus their life is materially increased.

Referring again to the construction of the individual shoes, it will be observed that each is of one piece construction and is ribbed for strength and to provide the desired tractive quality. Each shoe has longitudinally extending ribs 25 and 26 at its opposite edges on the ground engaging side. Also, each shoe has transverse ribs 27 at its opposite ends and a plurality of intermediate transverse ribs 28. Between the various ribs the body of the shoe is provided with openings 30 for self-clearing the shoe of mud or dirt.

The particular design and ribbing of the shoe affords ample traction without requiring attachment of any grouser cleats. Another feature of the track resides in the fact that the individual shoes are comparatively narrow and the hinge centers are close to the road surface. The short pitch, together with the exceptionally light construction, permits of an exceptionally fast operation of the track.

Furthermore, damage to roadways is overcome since there will be no digging in or "washboarding" of road surfaces.

A track of this type of construction is easily and quickly assembled without special tools. Furthermore, the hinge and bearing assembly of a shoe may be easily removed and replaced at a small cost. Long life is given the track by reason of the positive preclusion of foreign matter from all bearing surfaces and by reason of the absorption of road shock in the use of the rubber bushings; the bushings in turn being protracted against possible detrimental deformation by use of the overload bearings which absorb all heavy pulls.

Hinged connections of this kind may be put to various other uses, such for instance, as in connecting the links of a conveyor chain or for attaching together conveyor flights as used in saw mills and mines. Therefore, it is not desired that the claims, in so far as they apply to the hinge, shall be limited to use with a tractor tread.

It is to be understood also that the details of the hinge mounting might be altered to embody a plurality of the bushed chambers, and that other changes might be required to meet certain special conditions.

Having thus described my invention, what I claim as new therein and desire to secure by Letters-Patent is—

1. A connection for hingedly associated parts, comprising a hinge pin mounted by one of said parts and contained within a bearing chamber of the other part, resilient bushings applied to the pin within the chamber for sustaining normal loads, and a normally inactive member associated with the pin and chamber to sustain abnormal loads.

2. A connection for hingedly associated parts, comprising a hinge pin mounted by one part and contained rotatably within a bearing chamber of the other part, resilient bushings fitted about the pin within opposite ends of the chamber and through which normal tension is sustained, and a bearing member applied to the pin to engage with the chamber wall to sustain abnormal tension.

3. A connection for hingedly associated parts, comprising a hinge pin fixedly mounted by one of said parts and extending rotatably within a bearing chamber in the other part, resilient bushings fitted tightly about the pin within opposite ends of the chamber thereby sealing the latter and permitting hinging action of the connected parts by reason of deformation of the bushings and normally inactive means for sustaining overload on the bushings.

4. A connection for hingedly associated parts, comprising a hinge pin fixed in hinge ears on one of said parts and contained rotatably within a bearing chamber provided by the other part, resilient bushings fitted about the pin within the ends of the chamber to seal the latter and permitting hinging action by deformation of the bushings and means on the pin engageable with the chamber wall to sustain overload on the bushings.

5. A connection for hingedly associated parts, comprising a hinge pin fixed in hinge ears of one of said parts and contained rotatably within a bearing chamber provided within a hinge ear of the other part, resilient bushings fitted about the pin within opposite ends of the chamber to seal the latter and permitting hinging action of the parts through deformation of the bushings and an overload bearing roller mounted on the pin between the bushings normally free of the chamber walls but engageable, to sustain the overload, when the bushings are deformed by abnormal strain.

6. A connection for hingedly associated parts comprising a hinge pin fixed at its ends in hinge ears of one of said parts and having an intermediate portion rotatably contained within a cylindrical bearing chamber of the other part; said chamber being substantially of larger diameter than the pin, resilient bushings fitted to the pin within opposite ends of the chamber and sealing the latter, and permitting hinging action of the joined parts through deformation of the bushings, a cylindrical bearing sleeve fitted within the chamber between the bushings, a bearing roller of smaller diameter mounted on the pin within the sleeve and adapted to bear in rolling contact with the sleeve to prevent abnormal deformation of the bushings.

7. A tractor tread comprising traction shoes, each having hinge ears at one edge and a hinge pin fixed at its ends in said ears, and having a chambered ear at its opposite edge for axially containing the hinge pin of the adjacent shoe therein, rubber bushings fitted about the pin within opposite ends of the chamber to seal the latter and permitting hinging action of the connected parts through deformation of the bushings, and means on the pin engageable with the chamber wall to sustain overload on the bushings.

FRANK H. LAMB.